Jan. 27, 1953 H. W. RICHARDS 2,627,063

CARRIER FREQUENCY STEPPING SYSTEM FOR REMOTE CONTROL

Filed Dec. 2, 1947 3 Sheets-Sheet 1

INVENTOR:
HARRY W. RICHARDS
BY
ATTORNEY

Jan. 27, 1953 H. W. RICHARDS 2,627,063

CARRIER FREQUENCY STEPPING SYSTEM FOR REMOTE CONTROL

Filed Dec. 2, 1947 3 Sheets-Sheet 2

INVENTOR:
HARRY W. RICHARDS
BY
ATTORNEY

Jan. 27, 1953 H. W. RICHARDS 2,627,063

CARRIER FREQUENCY STEPPING SYSTEM FOR REMOTE CONTROL

Filed Dec. 2, 1947 3 Sheets-Sheet 3

INVENTOR:
HARRY W. RICHARDS
BY
ATTORNEY

Patented Jan. 27, 1953

2,627,063

UNITED STATES PATENT OFFICE 2,627,063

CARRIER FREQUENCY STEPPING SYSTEM FOR REMOTE CONTROL

Harry W. Richards, Clearfield, Pa., assignor, by mesne assignments, to Electronic Switch and Signal Company, Cleveland, Ohio, a corporation of Ohio Application December 2, 1947, Serial No. 789,216

10 Claims. (Cl. 340—163)

This invention relates to electric automatic train control systems and more specifically to those having to do with centralized traffic control, wherein stepping switches are utilized and controlled by variations of the time duration between the steps thereof in connection with the application of carrier frequencies to a transmission line, respecting the controls and indications desired.

More specifically this invention is particularly directed to a mechanism for controlling the operations of and indications for a power operated switch in the trackway of a railroad and therefore the drawings show such a switch control, though it will be understood that the same mechanism of this invention may be utilized for the controls and indications of other trackside devices used in railway systems.

With these and other objects in view of the invention resides in the novel details of construction and combinations of parts as will be disclosed more fully hereinafter and particularly covered by the claims.

Referring to the accompanying drawings forming a part of this specification and in which like numerals designate like parts in all the views, Fig. 1 is a typical wiring diagram for the transmission of controls and signals from a control office, and the receipt thereof at a field station;

Figure 1:
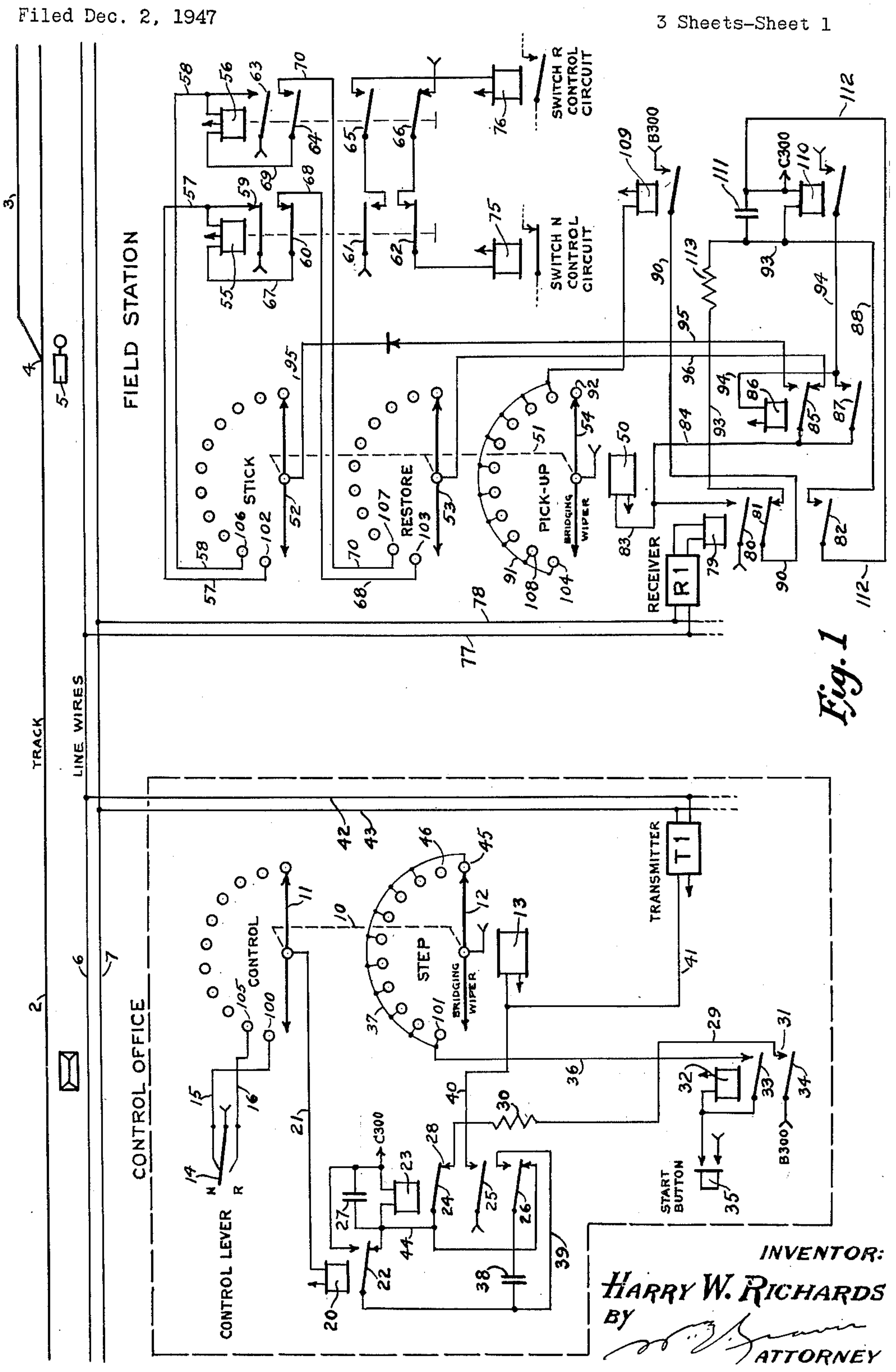

The track is indicated at 2, provided with a siding 3 joining the same at the switch 4, the numeral 5 designating a typical power machine for operating said switch, and a pair of line wires are indicated at 6 and 7. The controls office or dispatcher's station is indicated by the dashed line rectangle, and a field station is indicated which may be located at some point distant from the control office, in the drawings the particular field station being that one which is located at and for the control of the switch 4. However, it is to be understood that a plurality of field stations may exist, one for each point on the trackside for the control of traffic but, in the interest of simplicity of the drawings, only one field station is shown. That is to say, different operating frequencies are contemplated for the plurality of field stations, one frequency for each station and which frequency is different from the frequency for any other field station, wherefore the mechanisms at the plurality of field stations may be substantial duplicates, provided that the electronic transmitters and receivers at each field station will utilize or be tuned to one of the different and specific frequencies.

At the control office there is employed a stepping switch which may be of rotary type and having the shaft indicated at 10, such rotary switches being well known in the electrical art. Said switch has a plurality of double ended wipers commonly mounted on said shaft and insulated from each other, each wiper being rotated in one direction only over a semi-circular bank of contact points, the number of said points being as desired or found necessary. In such switches each bank of points is designated as a level, all of said levels being substantially parallel to each other, and in the drawings one such level is designated "control" while another level is entitled "step." Each switch has an electromagnet common to all the wipers of said switch, which magnet causes the switch to step when the circuit to the magnet is opened. The wiper for the control level is indicated at 11 and is of non-bridging character, the wiper for the step level is indicated at 12 and is of bridging character, and said magnet is indicated at 13.

Also at the control office there is provided a lever 14 which is manipulated by the dispatcher to make contact when in one position with a wire 15 connected to one of the points of the control level of said switch, and when in an opposite position makes contact with another wire 16 connected to a different contact point of said level, the two positions of said lever being indicative of normal and reverse operating positions of the switch machine 5, said lever being connected to a source of electric power. There will be a plurality of these control levers, one lever for each control desired on the trackside, only one lever being illustrated in the interest of simplicity of the drawings.

A relay 20 is provided, one end of the coil of which is connected by the wire 21 to the wiper 11 and the other end of which is connected to the common power return, said relay having the armature 22. A pulsing relay 23 has the plurality of interconnected armatures 24, 25 and 26, said relay 23 normally being deenergized, and across the coil of said relay is connected a condenser 27 which causes the relay to be slow operating in a manner well known in the art. When the pulsing relay is in deenergized condition, its armature 24 will rest upon the back contact 28 connected as by the wire 29 (having the resistor 30 therein) to the front contact 31 of a stick relay 32 whose interconnected armatures 33 and 34 are normally in their lower positions and attracted only by said relay 32 when energized by the manipulation of the start button 35 under the command of the dispatcher. The front contact of armature 33 is connected as by the wire 36 to the bus 37 common to all of the contact points (with the exception of the home contact) of the step level of said switch. A condenser 38 is interposed between armature 22 of relay 20 and armature 26 of the pulsing relay 23, and to this interconnection there is provided the wire 39 leading to the front contact of armature 26.

Figure 3:
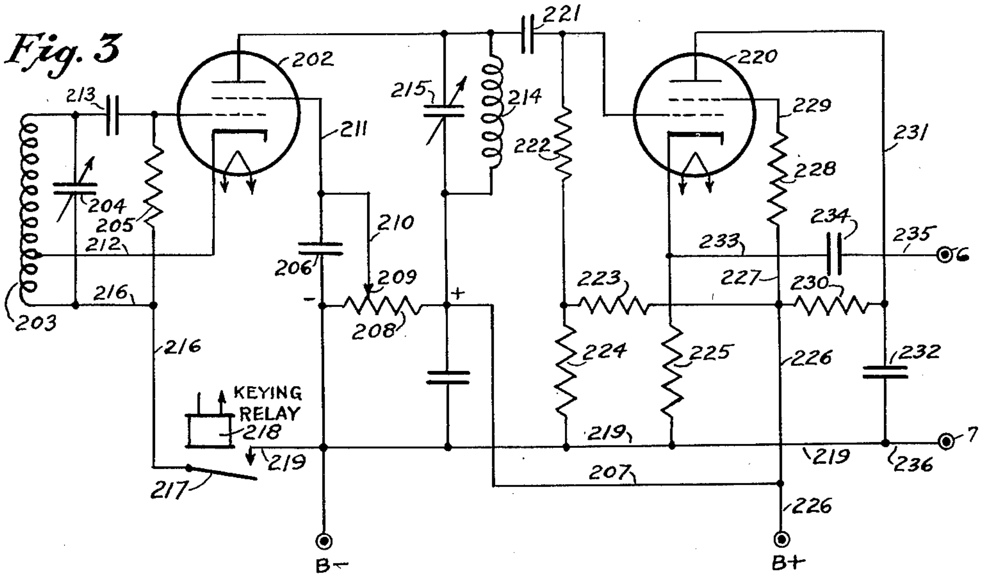
Fig. 3 is a wiring diagram of a typical electronic transmitter that may be used in connection with this invention.

The front contact of armature 25 of the pulsing relay is connected as by the wire 40 in a circuit to the magnet 13 of the stepping switch, and a branch of this circuit comprises wire 41 leading to the electronic transmitter T1, which may be of the type particularly illustrated in Fig. 3, said transmitter having its output connected as by the wires 42 and 43 respectively to the line wires 6 and 7. The pulsing relay is energized by the energization of relay 32 by virtue of armature 34 making contact with its front contact 31 thereby closing the circuit over wire 29, armature 24 and through the coil of said pulsing relay. Due to the connection of condenser 27 in shunt relation with the pulsing relay, the action of said relay will be delayed or slowed. The coil of relay 23 is of high inductance.

The energizing current applied to the pulsing relay circuit through armature 34 may be of the order of 300 volts D. C. It thus results that when this circuit is closed a heavy current will flow to wire 29, through resistor 30, through armature 24, and over wire 44 not only through the pulsing relay 23 but also through condenser 27 in shunt relation thereto and to the common return for said circuit indicated at C300. This heavy current passing through resistor 30 causes a voltage drop in the current used to energize said pulsing relay during the build up of the charge on condenser 27, thereby resulting in the initial slowing of the action of said relay, but when said condenser becomes fully charged, the current flowing in the circuit will be maintained at a lower voltage in accordance with the total resistances incident to the resistor 30 and the coil of said relay.

When the pulsing relay 23 becomes energized and attracts its armatures 24, 25 and 26, the aforesaid circuit to said relay will be opened at the contact 28 whereupon, during the discharge of condenser 27, said relay will be momentarily retarded in the release of its holding power on its armatures thus establishing a time delay the purpose of which will be described hereinafter. By varying the values of the resistor 30, the condenser 27 and the applied high voltage, the delayed actions of the pulsing relay can be adjusted as to the timing of its oscillation as desired. The purpose of the condenser 38 is to provide increased capacity in conjunction with the condenser 27 when relay 20 is energized. That is to say, one side of condenser 38 is connected through the front contact of relay 20 to one side of condenser 27, and the other side of condenser 38 is connected through the back contact of armature 26 and wire 44 to the opposite side of condenser 27, thereby producing an additive effect of both of said condensers which effect has the result of increasing the delayed action of the pulsing relay, or in other words produces a longer delay in the pick-up action of relay 23.

When the relay 20 is deenergized the timing of the pick-up of relay 23 is of such duration as to make possible the release of a particular control relay at the field station. However, when the relay 20 is energized, the timing of the pick-up of relay 23 will be of longer duration by virtue of the additive effect of condensers 27 and 38 thus making possible the pick-up of said particular field station control relay, these actions to be described hereinafter.

As clearly shown in Fig. 1, the step level of the stepping switch has the bus 37 which is electrically connected in parallel with all of the contact points of that level with the exception of the next to the last or home contact point 45, said next to the last contact point being designated by the numeral 46. The bridging wiper 12 of that level is caused to move successively in steps or jumps from one contact point to the next. It is desirable that the circuit through this bridging wiper be maintained without interruption as the wiper rotates, and consequently said wiper is designed so that successive contact points are momentarily bridged as the wiper moves from one contact point to the next, and in all cases the wiper when at rest touches only one contact point. However, when said wiper reaches contact point 46 which is not connected to the bus 37, the circuit through the step level of the switch will be opened, thereby breaking the stick circuit which otherwise maintains relay 32 in energized condition when picked up by manipulation of the start button 35.

At the field station there is provided a magnet 50, substantially similar to the magnet 13, at the control office, in that it actuates a shaft 51 upon which is rigidly mounted a plurality of double ended wipers such as 52, 53 and 54 each associated with an operating level of a stepping switch also similar to that at the control office, each level comprising a home contact and a plurality of contact points all adapted to be contacted by said wipers as they step in rotative manner by virtue of said shaft. One of said levels is identified as a "stick" level, another a "restore" level and the third a "pick-up" level, the wiper 54 being of bridging character whereas the other wipers are of non-bridging character, similar to the wipers 11 and 12 described for the control office switches.

Associated with the stick and restore levels are one or more final stick relays which are of well known "buck-out" character in that each has two windings which when energized produce magnetic fluxes in the core of the relay which are in opposition to each other. That is to say, when current is passed through one of the windings the relay armature will be attracted, but if current is applied simultaneously to both windings there will be no opposition with respect to the magnetic fluxes created by both windings, resulting in a neutralization or "bucking" of the armature holding flux which causes the armature to be released, it being understood that the fluxes created by both windings are of substantially equal value, and that both of said windings are connected to a common return to the electric power source as indicated. In Fig. 1 two such relays 55 and 56 have been illustrated, one winding of relay 55 being connected as by the wire 57 to one contact point of the stick level, and one winding of the relay 56 being similarly connected as by the wire 58 to a different contact point of said stick level.

The final stick relay 55 has a plurality (four as indicated) of interconnected armatures 59, 60, 61 and 62 for simultaneous actuation, and the other final stick relay 56 has similar interconnected armatures 63, 64, 65 and 66. Hence, when each relay is energized by current flowing over wires 57 and 58, said armatures will be attracted, the armatures 59 and 63 through their front contacts completing a stick holding circuit to said relays. Also the armatures 60 and 64, when attracted, will complete a circuit from the other winding of their respective relays to the restore level of the stepping switch, as by the wires 67—68 and 69—70 to two different contact points of said restore level.

The pair of armatures 66 and 62 are associated with and control the energization of the relay 75, said relay being for controlling the switch machine 5 to cause its actuation for the normal (N) position of the switch 4. In similar manner the pair of armatures 65 and 61 are associated with and control the energization of the relay 76, said relay for controlling said switch machine to cause its actuation for the reverse (R) position of said switch.

That is to say, when the armature 62 is in its up position at the same time that armature 66 is in its down position, a circuit will be closed through relay 75 attracting its armature to in turn close a circuit not shown but capable of actuating the switch machine. In like manner when armature 61 is in its down position at the same time that armature 65 is in its up position, a circuit is completed to energize the other relay 76 to in turn close through its armature a circuit (not shown) to said switch machine for operating the same in a manner reverse to that caused by the energization of relay 75. It will thus be seen that should for any reason all of armatures 61, 62, 65 and 66 be in their up or down positions, no circuit will be completed to either of relays 75 and 76 in which case the switch machine will not be affected.

The line wires 6 and 7 are connected respectively by wires 77 and 78 with an electronic receiver R1 at the field station, which receiver may be of the type described more fully hereinafter and particularly illustrated in Fig. 4, and which receiver is tuned to be responsive only to the frequency transmitted by transmitter T1 at the control office, i. e. responsive to no other transmitter frequency. This receiver has associated therewith a relay 79 having a plurality of interconnected armatures 80, 81 and 82. When the relay 79 is energized by the received frequency, armature 80 will be attracted and through its front contact close a circuit over wire 83 and through the magnet 50 as will be clear from the drawing, a branch of this circuit comprising a wire 84 connected to the armature 85 of a relay 86, said armature 85 being interconnected with a second armature 87, which is also connected to wire 84.

Current from a 300 volt D. C. source through the front contact and armature of a relay 109 may pass over the wire 90 to the armature 81 of magnet 79 and thence over wire 93 (having a resistor 113 therein as shown) to and through the winding of relay 110 and back to source as designated at C300. The winding of said relay 110 has a condenser 111 connected in shunt relation therewith as shown. Wires 88 and 112 together with armature 82 and its front contact, constitute a shunt circuit for said condenser 111 and said relay 110, so that when said armature is in its up position, a circuit will be closed to cause discharge of said condenser; the purpose of the condenser is to slow the pick-up action of said relay as it becomes charged by virtue of the circuit comprising wires 90 and 93. When armature 82 engages its front contact, whatever amount of charge has been previously stored up in said condenser, through operation of the preceding step of the stepping switch, will be fully discharged, so that the condenser will be placed in discharged condition to receive a new charge at the initiation of the next timing period required for the full energization of relay 110.

Energization of relay 110 picks up its armature to close a circuit over wire 94 to and through the relay 86 having the interconnected armatures 85 and 87. Armature 85 has its front contact connected as by wire 95 to the wiper 52 of the stick level and has its back contact connected as by the wire 96 to the wiper 53 of the restore level of the field station stepping switch, said wire 95 having a rectifier interposed therein for the purpose of limiting the flow of current to one direction only. The construction and operation of the pick-up level of said switch is similar to the construction and operation of the step level of the stepping switch at the control office. It is an important feature of this invention that the stepping switches at the control office and field station are of such character that they are conditioned by the energization of their respective magnets 13 and 50, and that their wipers are stepped when the magnet circuits are opened.

From the foregoing description and referring particularly to Fig. 1, a set-up is shown for the normal actuation of the switch machine 5, which is the normal condition of the system. That is to say, at the control office the control lever 14 for said switch machine is shown in its up position for such normal control whereby current is fed by wire 15 to contact point 100 of the control level of the stepping switch. To initiate the control at the field station, the start button 35 is pressed momentarily to close a circuit through the relay 32 thereby closing a circuit by armature 34 and wire 29 through armature 24, wire 44 to and through relay 23 (having a slow pick-up) energizing the latter and through its attracted armature 25 and wire 40 energizing magnet 13 and simultaneously actuating transmitter T1 to send the frequency thereof on to the transmission line.

When armature 25 is attracted by the delayed action of relay 23, the armature 24 is also attracted and breaks the circuit at contact point 28 to cause the relay 23 to become deenergized, and when this occurs armature 25 will drop and open the circuit to magnet 13 as well as to transmitter T1, and when said magnet becomes deenergized the wipers of the stepping switch will move from their home positions to the first contact points 100 and 101 respectively of the series of points in each level of said switch.

When the wiper 11 of the control level of said switch arrives at contact point 100, current through the control lever 14 will pass over wire 21 to the relay 20 energizing the same and attracting its armature 22 to connect condensers 27 and 38 in additive relation. At the same time, bridging wiper 12 will have stepped to contact point 101 whereby current will pass from said wiper through said contact point and wire 36 and armature 33 (in its up position by virtue of the depressed start button 35) to and through the coil of relay 32 to maintain said relay energized through this stick circuit, whereupon the armatures 33 and 34 will remain in their up positions, the latter maintaining closed the circuit over wire 29 through armatures 24 and 26 to give the additive effect of condensers 27 and 38 to relay 23 resulting in the delay pick-up action thereof.

This delayed action of the pick-up of the armatures of relay 23 results in the successive energization and deenergization of magnet 13 after the relay 32 has been thus energized by actuation of the start button 35, this resulting in the successive stepping of the wipers in the stepping switch. In other words the relay 23 has oscillating action the time of which is controlled by the capacities of the condensers 27 and 38 as well as the value of the resistor 30, and the continued oscillations of said relay create the successive stepping of the stepping switch not only in the control office but in the stepping switch at the field station through the receiver R1 tuned to be responsive to the frequency output of transmitter T1. The remaining contact points in the control level of the stepping switch at the control office may be similarly connected for the control of other signals, controls or operating mechanisms at the same field station, said controls etc. at the field station being electrically connected through relays and circuits similar to those previously described and which are connected to corresponding contact points on the stick and restore levels of the stepping switch at said field station.

At the field station, the wipers 52, 53 and 54 of its stepping switch will be actuated synchronously with the actuation of the wipers of the stepping switch at the control office, or in other words when wipers 11 and 12 have moved respectively to contact points 100 and 101 at the control office, the wipers 52, 53 and 54 will have moved respectively to the contact points 102, 103 and 104 of the switch at the field station, this being caused by the deenergization of magnet 50 whose deenergization in turn is caused by the deenergization of the receiver relay 79. When said relay 79 is deenergized, its armature will fall, whereupon 300 volt D. C. current will flow (when relay 109 is energized by current supplied through wiper 54 and bus 91 associated therewith) over wire 90, back contact 81, wire 93 to relay 110 slowly energizing the same by virtue of the condenser 111 and causing the armature of said relay to be picked up to permit current to flow over wire 94 to energize relay 86.

Due to the additive effect of the capacities of condensers 27 and 38 at the control office and their being connected across the coil of relay 23, the pick-up tie of said relay will be of such delayed duration as to permit the pick-up action of relay 110 at the field station to become effective, in turn closing its armature with its front contact so as to establish a circuit over wire 94 to energize relay 86 thereby attracting its armature 85 to its front contact and completing a circuit over wire 95 to wiper 52 of the stick level of the field station switch, and through contact point 102, wire 57 to and through the pick-up winding of the final stick relay 55, but no current will flow in such circuit until the receiver R1 energizes its relay 79.

When condensers 27 and 38 at the control office become fully charged, relay 23 will become energized to attract its armatures, whereupon the closing of its armature 25 will wire 40 will operate transmitter T1 the output frequency of which will go over the transmission line, be received at the field station receiver R1 and cause energization of its relay 79 to attract its armatures, the attraction of armature 80 completing a circuit over wires 84 and 95, wiper 52, wire 57 and the pick-up winding of relay 55 which latter in turn causes energization of said relay 55 to attract its armatures. The attraction of armature 59 creates a stick circuit including said winding to maintain the relay energized after wiper 52 leaves the contact point 102. The simultaneous attraction of armature 62 closes a circuit through relay 75 causing the switch machine 5 to be actuated to its normal (N) position. With the energization of receiver relay 79 there is simultaneous energization of magnets 13 (at the control office) and 50 (at the field station), thereby conditioning the stepping switches for the next successive step movement of the respective wipers.

When relay 23 is energized and its armatures are up, the circuit is broken at contact point 28 thereby initiating the deenergization of said relay which is retarded by the charged condition of condenser 27, and simultaneously the armature 26 will be in its up position causing a closed circuit comprising wire 39 for the immediate discharge of condenser 38. Upon this relatively quick release of the armatures from relay 23 the circuit through magnet 13 (and likewise the circuit through magnet 50 at the field station) will be opened causing the stepping action of the wipers of the stepping switches at both the control office and the field station, thereby causing the movement of wiper 11 from contact point 100 to the next contact point 105, and the synchronous or simultaneous movements of the wipers in the field station to contact points 106, 107 and 108. At the control office, there being no current on contact point 105 by virtue of the N position of the control lever 14, relay 20 will become deenergized, so that condenser 27 will be the only capacity across the relay 23, because the other condenser 38 will be shorted or discharged through the closing of the back contact of the armature 22 of said relay.

This results in enhancing or increasing the action of relay 23 so that it will have or be capable of having a quick pick-up which is transmitted simultaneously to the receiver relay 79 causing it to have a quick pick-up action, and current will flow immediately over wires 84 and 96 to the wiper 53, contact 107 and wire 70 to the front contact of armature 64 which is in its dropped position, wherefore the circuit will be broken at said armature and no current will flow therefrom to the winding of final stick relay 56. If however, by a previous operation, relay 56 will have been energized so that its armatures will be in their up positions, then current will flow from wire 70 through armature 64 and wire 69 to energize the buck-out winding of relay 56, thereby neutralizing the pick-up value of the magnetic flux in said relay and causing a release and drop of all of the armatures of said relay. The action just described is substantially instantaneous and takes place in a time duration which is less than that required for the complete energization of the slow pick-up relay 110.

It will be seen from the above description that the apparatus at the field station is controlled in accordance with the duration of the interval or dwell between successive energizations of the transmitter T1. In other words, receiver R1 and relay 79 will be operated each time the transmitted frequency is interrupted, to cause magnet 50 to advance the stepping switch in synchronism with that at the control office, so that the stepping switch acts as a counting device for the received pulses. Also, at each position of the stepping switch wiper 52, a circuit is prepared to one of the final stick relays (such as 55, 56) for controlling the track switch or other two-condition device; however, this prepared circuit is actually energized only when slow-acting relay 110 operates to energize relay 86 and thereby to connect the current supply to wire 95 and thence to the appropriate one of the final stick relays 55 and 56. Inasmuch as operation of relay 110 energizes relay coil 86 and hence lifts its armature 85 away from the back contact thereof, it also effectually renders relay 86 ineffective to energize conductor 96 and hence prevents the latter relay from altering the condition of the corresponding final stick relay.

When the wiper 12 at the control office reaches the isolated contact 46 it will have no connection with any of the other bus-connected contact points in the step level of the switch, whereupon current will cease to flow from bus 37, through wire 36, armature 33 and relay 32, causing the armatures of said relay to drop, and when the circuit is broken at contact point 31 no current will flow over the wire 29 and hence pulsing relay 23 will become deenergized and remain so until current is again supplied to the system. When relay 23 is deenergized its armature 25 will fall and open the circuit through the magnet 13 thereby causing the stepping switch to step and thereby move the wipers thereof to their home position, or in other words move wiper 12 to home contact point 45, whereupon bus 37 and wire 36 become energized and, upon actuation of the start button, current will be supplied to energize relay 32, attracting its armature 33 to establish the stick circuit for said relay, and thereby again supply current to the system including the energization of relay 23. Since oscillations of relay 23 are necessary to motivate the wipers of the stepping switches, said wipers will remain on their home contacts.

Figure 2:
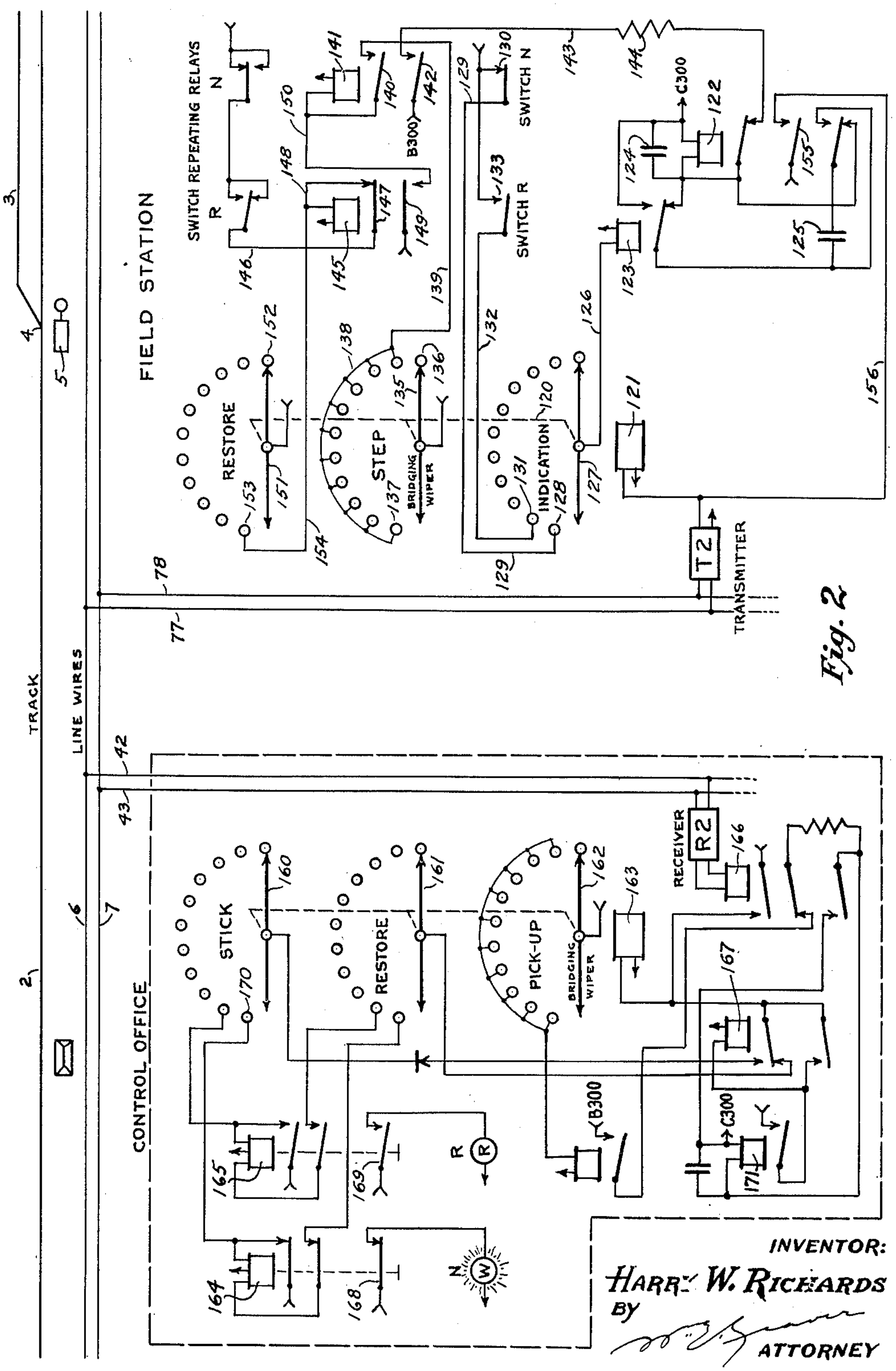
Fig. 2 is a typical wiring diagram of the circuits between a field station and the control office whereby indications may be transmitted from the former to the latter.

Referring to Fig. 2 the same track, siding, switch control machine and line wires are illustrated, as well as the control office and the same field station, and the same lead-in wires 42—43 and 77—78 since said lead-in wires and said line wires may carry a multiplicity of operating frequencies. The purpose of Fig. 2 is to illustrate how this same system may be utilized in a reverse manner to give at the control office indications of the performed operations at the field station so that the dispatcher may know that the controls sent out by him have not only been received but properly set up and/or completed.

To this end a second stepping switch is provided at the field station, which is similar to the previously described stepping switch at the field station in that, as illustrated, it is provided with three levels identified as "restore," "step" and "indication," each level having a double ended wiper rigidly mounted on a common shaft 120 and adapted to be given step rotation through deenergization of the magnet 121 which is a substantial duplicate of magnet 13 shown in Fig. 1. This magnet 121 is connected to and controlled by a pulsing relay 122 and a second relay 123 which are substantial duplicates respectively of the relays 23 and 20 shown in Fig. 1. Also the condensers 124 and 125 and all of the electrical connections between said condensers and relays are substantial duplicates of the condensers 27 and 38 and the electrical connections associated therewith as shown in Fig. 1. The relay 123 is connected as by the wire 126 to the wiper 127 of the indication level of the stepping switch, and the first contact point 128 of said indication level is connected as by the wire 129 to the contact 130 which is closed when the track switch 4 is in its normal (N) position, and the second contact point 131 of said level is connected as by the wire 132 to the contact 133 which is closed when the track switch 4 is in its reverse (R) position, any suitable mechanism for closing these contacts being utilized but not illustrated in the interest of simplicity of the drawing.

The step level of this second stepping switch has its bridging wiper 135 (similar in character and operation to wipers 12 and 54) capable of making contact with a home position 136 as well as with a plurality of other contact points such as 137 all connected in parallel by the bus 138, which bus in connected as by the wire 139 to the front contact for the armature 140 of the relay 141. A second armature 142, movable in unison with armature 140, has its front contact connected as by the wire 143 to the back contact for one of the interconnected armatures of relay 122, the said wire having the resistor 144 therein, the parts 139, 140, 141, 142, 143 and 144 being substantial counterparts respectively of parts 36, 33, 32, 34, 29, 30 and 113 shown in Fig. 1.

Switch repeating relays of any suitable and well known type are provided, one relay being for the normal (N) position and the other relay being for the reverse (R) position of the switch 4. The purpose of these repeating relays is to momentarily interrupt the stick circuit of a quick acting relay 145, the circuit being controlled by front and back contacts of members movable therebetween and activated by the switch mechanism, and the wire 146 and armature 147 and wire 148 to and through the coil of said relay.

Thus it will be understood that any change in the position of the switch 4 will mechanically cause the movable members of said repeating relays to move from one contact to another, and when this movement occurs the movable member will traverse the gap or space between said contacts and thus interrupt the holding or stick circuit of the relay 145. When this occurs the armatures of said relay, moving in unison, will drop whereupon the armature 149 thereof will complete a circuit over the wire 150 to and through the coil of relay 141 energizing the same to attract its armatures, so that the armature 142 may pass the high voltage current B300 to wire 143 for energizing the pulsing relay 122, the operation of which is substantially identical to the operation taking place upon the closing of contact 31 at the control office shown in and described for Fig. 1.

The ensuing operation upon actuation of relay 122 with its associated magnet 121, causes rotative step movement of all of the wipers of this second field station stepping switch. It thus follows that when the wiper 151 of the restore level moves from its home position 152 to the contact point 153, current is caused to flow over wire 154 to and through the coil of relay 145, restoring the same to energized condition in which it is maintained through the stick circuit described therefor and comprising the wire 146.

Simultaneously the bridging wiper 135 of the step level moves to the contact point 137 thereof whereupon current will flow through the bus 138, wire 139, armature 140 and to and through the coil of relay 141 as a stick circuit to maintain relay 141 energized until the said wiper has reached the home position 136 whereupon said stick circuit is broken and said relay 141 will become deenergized. The breaking of this stick circuit, causes armature 142 to drop and thereby break the circuit over wire 143 resulting in the deenergization of the pulsing relay 122, whereupon rotative movement of all of the wipers ceases with said wipers in their respective home positions where they will remain until the remotivation of said wipers which is brought about by a change in position of switch 4 which momentarily interrupts the holding circuit of relay 145 through the repeating relays. When the pulsing relay 122 is fully energized its armature 155 closes a circuit over wire 156 to energize the magnet 121 and also to pass current into the transmitter T2 whose output thereupon is impressed as a specific frequency on the wires 77 and 78 for transmittal to the control office.

At the control office there is a substantial duplicate of the electrical apparatus and connections shown in the field station as illustrated in Fig. 1 and fully described hereinabove except that, in place of the indicated normal (N) and reverse (R) circuit control relays 75 and 76 of Fig. 1, there is provided a signal indication at the control office in Fig. 2, which indication may be of any suitable character, audible or visual or both. Furthermore the operation of the parts shown in Fig. 2 is substantially identical with the operation of the parts shown in and described for the field station of Fig. 1.

That is to say, there is a duplication of the stepping switch and comprising wipers 160, 161 and 162 for the "stick," "restore" and "pick-up" levels respectively, a magnet 163, final stick relays 164 and 165, a receiver relay 166, and relays 167 and 171, all of which are counterparts in construction and operation of the parts 52, 53, 54, 50, 55, 56, 79, 86 and 110 respectively shown in Fig. 1, the relay 166 being energized by the frequency input of receiver R2. The electrical connections between these recited parts are also substantial duplicates of those shown and described in connection with the electrical connections for the field station of Fig. 1.

The only variation from the disclosure of Fig. 1 resides in the operation of the indications controlled by the final stick relays 164 and 165. That is to say, instead of the pair of armatures 61—62, and the pair of armatures 65—66 of Fig. 1, there is provided respectively a single armature 168 associated with relay 164, and another single armature 169 associated with relay 165, each single armature, when closed with its respective front contact, closing a circuit to the indication which in Fig. 2 is indicated as an electric lamp with an appropriate designation such as coloration to indicate the normal (N) or reverse (R) position of the switch 4 at the field station, these lamps having the designations W and R as indicative of the color white (normal) and red (reverse).

It thus results, when the switch 4 is operated to its normal (N) position, the contact 130 will be closed so that current will be supplied to contact point 128 of the indication level at the field station stepping switch, and simultaneously therewith the relay 145 will become deenergized thereby initiating the stepping movements of all of the wipers of said stepping switch and, through the transmitted frequency over the line wires, will simultaneously initiate the stepping movements of all of the wipers of the stepping switch at the control office, the wipers thereof being in synchronism with the wipers at the field station, or in other words in their home positions at such initiation of movement.

It therefore follows that when the wiper 127 at the field station contacts with the point 128, current will flow to energize relay 123 causing a delayed pick-up of the pulsing relay 122. This delay is sufficient to permit the slow pick-up relay 171 to become fully energized (and thus energize relay 167) so that when relay 122 becomes energized current will flow over wire 156 to activate transmitter T2 the frequency of which will be transmitted over the transmission line and received by receiver R2 which thereupon energizes the receiver relay 166 to complete a circuit over the front contact of relay 167 to the wiper 160 to and through the contact point 170 and the pick-up winding of the final stick relay 164, energizing the same. When thus energized its armatures will complete a stick circuit to maintain the relay energized after the wiper 160 passes beyond the contact point 170, said signal indication being made effective at the control office by such energized condition of said relay.

This indication is extinguished by any change in condition of the switch 4 operating through the switch repeating relays, which results in the closing of a circuit through the restore level of the stepping switch and through the buck-out winding of final stick relay 164 thereby neutralizing the magnetic flux through said relay 164 permitting its armature 168 to drop and break the circuit through said (N) indication (lamp). In similar manner the other (R) indication (lamp) is affected by the energized condition of the other final stick relay 165, controlled by the closing of contact 133 at the field station when the switch machine 5 (and consequently the switch 4) has moved to its reversed (R) position.

Figure 4:
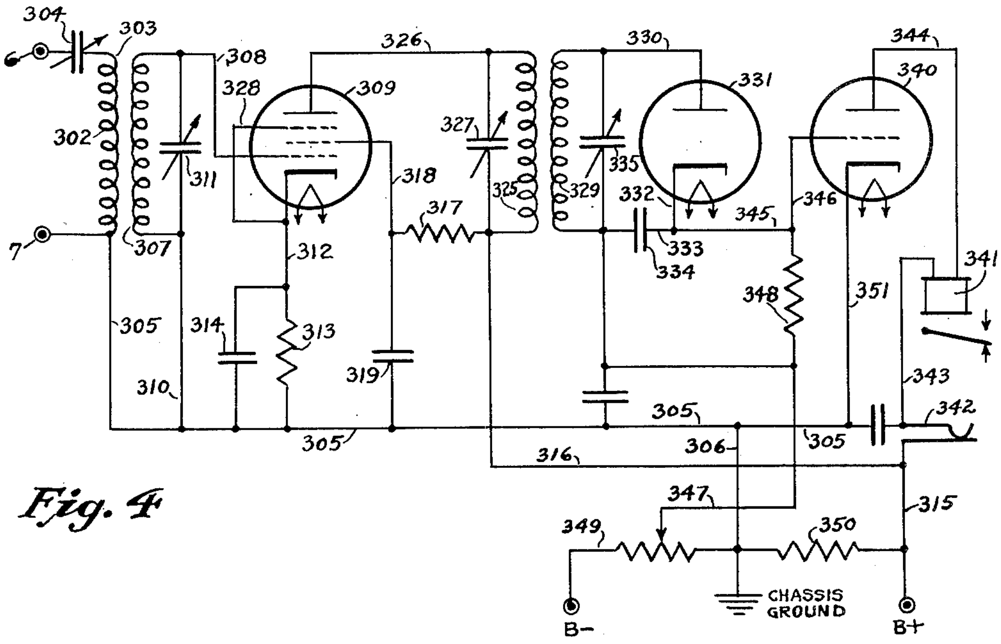
Fig. 4 is a wiring diagram of a typical electronic receiver that may be used in connection with this invention.

In order that the foregoing may be better understood, and to make the operation of this system complete, reference is now made to Figs. 3 and 4 illustrating respectively, in more or less detail, typical transmitters and receivers which may be used successfully in the transmission of signals and indications, controls and operations as contemplated by this invention.

The circuit arrangement for a preferred type of electronic transmitter unit, for use in the system herein described, is shown diagrammatically in Fig. 3, and comprises an electron coupled oscillator stage for generating the desired current frequency, and an amplifier output stage for delivering the power to the line wires 6 and 7 when the oscillator is "keyed" through the energization of a keying relay which may be built into the unit.

The electron coupled oscillator circuit includes a screen grid tube 202, the oscillator tank circuit comprising the tank coil 203 and tuning condenser 204, and the grid leak resistor 205. The screen is grounded for R. F. through a by-pass condenser 206 but has the usual D. C. potential supplied by the circuit which includes the wire 207 to the plus end of the voltage divider resistor 208, the voltage tap 209, over wires 210 and 211. The cathode connection is made to a tap on the coil as by the wire 212 to provide feed back. The tank circuit is coupled to the grid of the tube through the grid condenser 213. In the plate circuit, a resonant circuit, comprising the coil 214 and the tuning condenser 215, can be connected as shown, and is tuned to the oscillator frequency. Plate current is supplied as by the wire 207, to the tuned circuit 214, 215, thence to the plate of the tube.

The lower end of the oscillator tank circuit 203, 204 and the grid resistor 205 is connected as by the common wire 216 to the armature 217 of the keying relay 218. The front contact of this relay connects to ground (B—) through the common wire 219, completing the oscillator circuit to ground when the relay is energized, and causing the frequency to be delivered to the grid of of the amplifier tube.

This self-controlled oscillator is designed purely for frequency control and not to give appreciable power output, hence small tubes of the receiving type may be used. The power output ordinarily is not more than a watt or two, an amplifier stage being used to increase the power to the desired level. The use of receiving tubes is advantageous mechanically, since the small elements are less susceptible to vibration and give greater stability of frequency and amplitude.

The power amplifier circuit includes the screen-grid amplifier tube 220, having its grid coupled to the oscillator plate circuit by a coupling condenser 221. The grid is biased through the resistors 222, 223 and 224, connected as shown. The cathode is biased through the resistor 225 having one end connected to ground as by the common wire 219. The screen current is supplied over the wires 226 and 227, the voltage drop resistor 228 and the wire 229 leading to the screen. Current to the plate is supplied over the wire 226, the voltage drop resistor 230, and wire 231 to the plate of the tube. The plate is by-passed to ground through the condenser 232. The output of the amplifier is delivered to the line wire 6 from the cathode of the tube 220, as by the wire 233, coupling condenser 234 and the wire 235. The ground wire 219 may be connected to the other line wire 7 by the wire 236 but it is to be understood that, when only one line wire is utilized in the control system, the wire 236 may be dispensed with, since the frequency output is directly impressed on the line through the wire 235.

The circuit arrangement for a preferred type of electronic receiver unit, for use in this system and which is associated with and responsive solely to a transmitter unit of a definite frequency output, is illustrated diagrammatically in Fig. 4, and comprises an amplifying stage, a rectifying stage and a relay operating output stage.

The amplifying stage comprises a line coupling transformer having a primary coil 302 one of whose ends is connected to the line wire 6 by wire 303 having a tuning condenser 304 therein. The other end of said primary is connected to a common ground wire 305 connecting with the wire 306 leading to a chassis ground. Said wire 305, adjacent said transformer, may be connected to the other line wire 7, but it is to be understood that, when only one line wire is utilized in the control system, this connection may be dispensed with.

The secondary coil 307 of said transformer has one end thereof connected by wire 308 to the grid of the amplifying tube 309, the other end of said secondary being connected as by the wire 310 to the common ground wire 305. Across the ends of, or in parallel with, said secondary there is provided a tuning condenser 311 as shown.

Said tube 309 has its cathode connected as by wire 312 to the bias resistor 313, the latter connected to said common ground wire, and around said resistor there is a by-pass condenser 314. The screen of said tube is supplied with current from B+ over wires 315, 316, through the voltage drop resistor 317 and over wire 318. The screen is by-passed to ground through the condenser 319 as shown.

The plate circuit of said tube 309 comprises the primary coil 325 of a second transformer, the plate being connected to one end of said coil by the wire 326, the other end of said coil being supplied with current from B+ over wires 315 and 316, there being provided another tuning condenser 327 connected in parallel with said primary. Said tube has a suppressor element therein disposed between the plate and the screen, said suppressor being connected by the wire 328 to the cathode of the tube thereby operating the suppressor at cathode potential.

The secondary coil 329 of said transformer has one end thereof connected by wire 330 to the plate of the diode rectifying tube 331, the cathode of this tube being connected as by the wires 332 and 333 to the other end of said coil, with a coupling condenser 334 provided in the wire 333. Thus it will be realized that there is established an A. C. path for current from said secondary through said tube. A tuning condenser 335 is connected in parallel with said secondary.

The relay output operating stage comprises a tube 340 having its plate directly connected to a relay 341 for energization thereof as by the wires 315, meter jack 342 and wires 343 and 344. This tube is supplied with positive grid bias from the cathode of the rectifying tube 331 by current over the wires 345 and 346, said wire 346 being normally connected as by the wire 347 through the resistor 348 to the variable member of a potentiometer 349, one end of said potentiometer being connected to the B— terminal of the plate supply current, and the other end of said potentiometer being connected to chassis ground. There is provided a fixed resistor 350 having one end connected to chassis ground and the opposite end connected to the B+ source of current supply, the two resistors 349 and 350 forming a voltage divider one leg of which, comprising the resistor 350, supplies the plate voltage to the tube 340 and the other leg of which, comprising the potentiometer 349, supplies (through its variable member 347) a negative bias to the grid of said tube. The cathode of said tube is connected by the wire 351 to the common ground 305.

Thus it will be understood from the foregoing descriptions, that when a circuit is established by the dispatcher at the control office for a predetermined signal and his start button is pressed, current will be supplied over said circuit, and when this current flows the specific transmitter in that circuit will have its keying relay energized by current flowing therethrough, thereby attracting its armature 217 to complete the oscillating circuit of the transmitter and thus cause the frequency thereof (which is predetermined by the tuning condenser 204) to be transmitted to the amplifying stage and thence impressed upon the line wire 6.

The associated receiver at the field station receives this current frequency from the line wire 6, thereby energizing the primary 302 of the line coupling transformer, which in turn impresses said frequency upon the grid of the amplifying tube 309. In the plate circuit of this amplifying tube the primary coil 325 will receive an amplified current of the same frequency as that received from the line, which amplified frequency is impressed by the secondary coil 329 upon the plate of the rectifying tube 331, said current passing from the plate to the cathode and returning to the said secondary through the wires 332, 333 and condenser 334, this flow of current being in the aforementioned A. C. current path.

Normally when there is no current on the line there will be no flow of current to the tube 331. The tube 340 is normally biased to cut-off by the negative current from potentiometer 349 through the resistor 348 and wire 346 to the grid of said tube. However, when current is on the line and flows through the A. C. current path, which includes the plate and cathode of the rectifying tube 331, a current will be impressed upon the grid of the tube 340 which will be positive with respect to said grid due to the rectification of the A. C. current from the plate of tube 331. This positive bias, when applied to the grid of tube 340 causes current to flow in the plate circuit of said tube thereby energizing the relay associated with said receiver unit. Each receiver unit is made solely responsive to the frequency impressed by its associated transmitter, by virtue of the circuits of each receiver being tuned as by its condensers 304, 311, 327 and 335.

Whereas in the drawings a physical transmission line is illustrated, it is to be understood that this invention contemplates the transmission and reception of controls, signals, etc. by radio in which case the transmissions between the stations and the control office are between respective antennas associated with the transmitters and receivers. Also, whereas this invention has been illustrated and described with reference to a railroad system, it can be used as a supervisory control for power stations and substations, for control of traffic other than trains, and in fact for many situations where remote control is involved. Further, in the claims the terms "transmitting station" and "receiving station" are to be understood as either the control office or a field station according to where the transmission originates. Also the term "switch device" is intended to cover any mechanism which operates or functions in a manner to accomplish the opening and/or closing of control circuits, and by "control means" is meant any electric and/or mechanical device which is directly responsible for the actuation of a roadside and/or central office control, signal, indication or other desired element of a system of this character and associated with the operating functions thereof.

It is obvious that those skilled in the art may vary the details of construction and arrangements of parts without departing from the spirit of this invention, wherefore it is desired not to be limited to the exact foregoing disclosure except as may be required by the claims.

What is claimed is:

1. A system for remote control comprising a transmitting station, a receiving station and means establishing a communication channel therebetween, a transmitter at the transmitting station adapted upon each manual energization thereof to transmit a characteristic electrical signal occurring as a predetermined number only of successive pulses, a receiver at the receiving station tuned to said transmitted signal, a counting device connected with said receiver so as to move stepwise synchronously with the pulses in said transmitted signal and adapted to move through a complete cycle of its operation during the occurrence of said predetermined number of pulses, means at the transmitting station for varying the character of selected pulses, means at said receiver to step-wise advance said counting device as aforesaid upon the reception of said transmitted signal, a plurality of modifiable devices, each having at least two condition states, respectively associated with different points on said counting device, first means responsive to the reception of said successive pulses for operating to one condition the modifiable device associated with the corresponding point of said counting device, and second means responsive to the reception of a pulse of the varied character for operating said modifiable device to another condition and for rendering ineffective the operation of said first means upon said modifiable device.

2. A system for remote control comprising a transmitting station, a receiving station and means establishing a communication channel therebetween, a transmitter at the transmitting station adapted upon each manual energization thereof to send out a transmitted signal of a designated frequency occurring as a predetermined number only of successive pulses, a receiver at the receiving station tuned to the frequency of said transmitted signal, a stepping switch connected with said receiver so as to move stepwise synchronously with the pulses in said transmitted signal and adapted to move through a complete cycle of its operation during the occurrence of said predetermined number of pulses, means at the transmitting station for varying the character of selected pulses, means at said receiver to advance said stepping switch upon the reception of each pulse, a plurality of two-condition devices respectively associated with different points on said stepping switch, first means responsive to the reception of said successive pulses for operating to one condition the device associated with the corresponding point of said stepping switch, and second means responsive to the reception of a pulse of the varied character for operating said device to its other condition and for rendering ineffective the operation of said first means upon said device.

3. A system for remote control in accordance with claim 2, in which said first and second means respectively comprise electrical relays.

4. A system for remote control comprising a transmitting station and a receiving station interconnected by a transmission line, a source of pulsating electric current having a designated frequency at the transmitting station and means for impressing said frequency upon the transmission line in successive pulses of substantially equal time duration, with normally uniform dwell periods therebetween, a receiver at said receiving station responsive solely to the pulses of the frequency transmitted from the transmitting station, a stepping switch associated with said receiver and energized to different positions synchronously with the pulses received by the receiver, a plurality of control means at said receiving station and respectively energized at different positions of said stepping switch when a non-uniform dwell period occurs in predetermined relation to such stepping switch position, and means at the transmitting station comprising a plurality of condensers whose capacities are in additive relation for selectively changing the time duration between the transmission of said pulses, said time change being in accordance with the desired operating function of said control means.

5. A system for remote control comprising a transmitting station and a receiving station interconnected by a transmission line, a source of pulsating electric current having a designated frequency at the transmitting station and means for impressing said frequency upon the transmission line in successive pulses of substantially equal time duration, with normally uniform dwell periods therebetween, a receiver at said receiving station responsive solely to the pulses of the frequency transmitted from the transmitting station, a stepping switch associated with said receiver and energized to different positions synchronously with the pulses received by the receiver, a plurality of control means at said receiving station and respectively energized at different positions of said stepping switch when a non-uniform dwell period occurs in predetermined relation to such stepping switch position, and means at the transmitting station and comprising a plurality of condensers whose capacities are in additive relation, and further comprising a slow-acting relay the time of operation of which is changed in accordance with the additive relation of the capacities of said condensers, said means for selectively changing the time duration between the transmission of said pulses, said time change being in accordance with the desired operating function of said control means.

6. A system for remote control comprising a transmitting station and a receiving station interconnected by a transmission line, a source of pulsating electric current having a designated frequency at the transmitting station and means for impressing said frequency upon the transmission line in successive pulses of substantially equal time duration, with normally uniform dwell periods therebetween, a receiver at said receiving station responsive solely to the pulses of the frequency transmitted from the transmitting station, a stepping switch associated with said receiver and energized to different positions synchronously with the pulses received by the receiver, a plurality of control means at said receiving station and respectively energized at different positions of said stepping switch when a non-uniform dwell period occurs in predetermined relation to such stepping switch position, and means at the transmitting station comprising a slow-acting relay the time of operation of which is changed by the selective addition of a load applied in parallel with the winding of said relay, said means for selectively changing the time duration between the transmission of said pulses, said time change being in accordance with the desired operating function of said control means.

7. A system for remote control comprising a transmitting station and a receiving station interconnected by a transmission line, a source of pulsating electric current having a designated frequency at the transmitting station and means for impressing said frequency upon the transmission line in successive pulses of substantially equal time duration, with normally uniform dwell periods therebetween, a receiver at said receiving station responsive solely to the pulses of the frequency transmitted from the transmitting station, a stepping switch associated with said receiver and energized to different positions synchronously with the pulses received by the receiver, a plurality of control means at said receiving station and respectively energized at different positions of said stepping switch when a non-uniform dwell period occurs in predetermined relation to such stepping switch position, and means at the transmitting station comprising a slow-acting relay and a load means selectively applied in parallel with the winding of said relay for selectively changing the time duration between the transmission of said pulses, said time change being in accordance with the desired operating function of said control means.

8. A system for remote control comprising a transmitting station and a receiving station, a source of pulsating electric current having a designated frequency at the transmitting station and means for transmitting said frequency to said receiving station in successive pulses, with normally uniform dwell periods therebetween, a receiver at said receiving station responsive solely to the pulses of the frequency transmitted from the transmitting station, a stepping switch associated with said receiver and energized to different positions synchronously with the pulses received by the receiver, a plurality of control means at said receiving station and respectively energized at different positions of said stepping switch when a non-uniform dwell period occurs in predetermined relation to such stepping switch position, and means at the transmitting station comprising an oscillating delayed action relay and a load means selectively applied in parallel with the winding of said relay, for selectively changing the time duration between the transmission of said pulses, said time change being in accordance with the desired operating function of said control means.

9. In a system for remote control which includes a transmitting station, a receiving station and electronic means for transmitting frequency impulses of substantially equal time duration from station to station, a transmitter for selectively changing the time duration between the transmission of said impulses, said time changing means comprising a slow-acting relay and a load means selectively applied in parallel with the winding of said relay.

10. In a system for remote control which includes a transmitting station, a receiving station and electronic means for transmitting frequency impulses of substantially equal time duration from station to station, a transmitter for selectively changing the time duration between the transmission of said impulses, said time changing means comprising a stepping switch, a slow-acting relay and a load means selectively applied in parallel with the winding of said relay by means energized by said switch.

HARRY W. RICHARDS.

REFERENCES CITED

The following references are of record in the file of this patent:

UNITED STATES PATENTS

| Number | Name | Date |
|---|---|---|
| 1,702,423 | Wensley | Feb. 19, 1929 |
| 1,765,494 | McCoy | June 24, 1930 |
| 1,794,591 | Dicke | Mar. 3, 1931 |
| 1,882,010 | Hershey | Oct. 11, 1932 |
| 2,040,425 | Biach | May 12, 1936 |
| 2,080,273 | Holmes | May 11, 1937 |
| 2,387,444 | Hayslett et al. | Oct. 23, 1945 |
| 2,399,738 | Howe | May 7, 1946 |
| 2,417,376 | Newman | Mar. 11, 1947 |